Jan. 19, 1926.
A. F. RAYMOND
TWO-HEAD ROTATABLE FASTENING DEVICE
Filed May 28, 1923 4 Sheets-Sheet 1
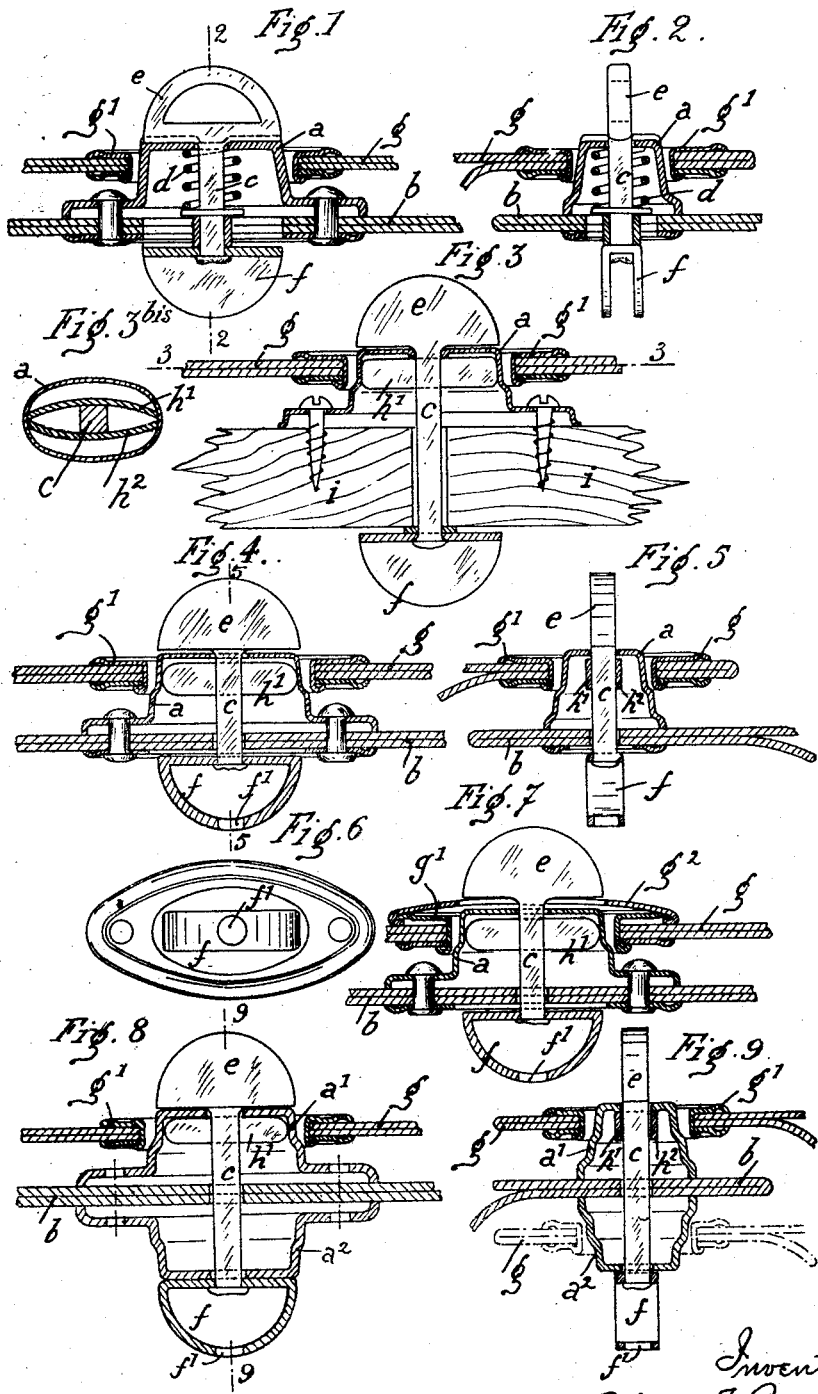

Jan. 19, 1926.　　　　　　　　　　　　　　　1,570,281
A. F. RAYMOND
TWO-HEAD ROTATABLE FASTENING DEVICE
Filed May 28, 1923　　　4 Sheets-Sheet 2
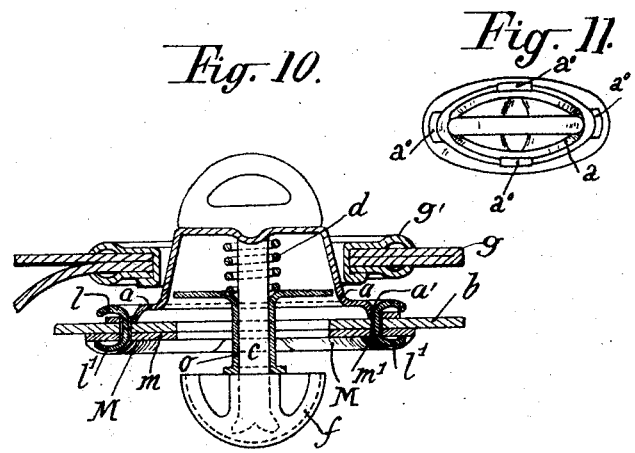
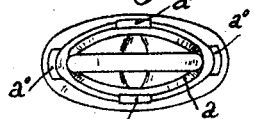
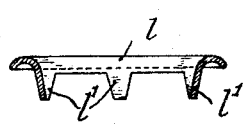
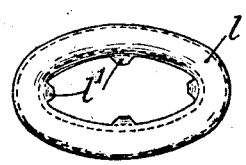
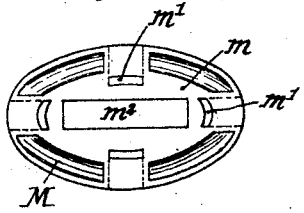
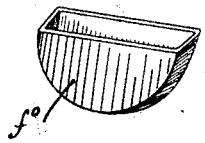
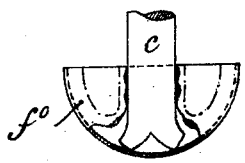
Inventor.
Achille F. Raymond,
By Henry Ortiz Atty.

Jan. 19, 1926.	1,570,281
A. F. RAYMOND
TWO-HEAD ROTATABLE FASTENING DEVICE
Filed May 28, 1923    4 Sheets-Sheet 3
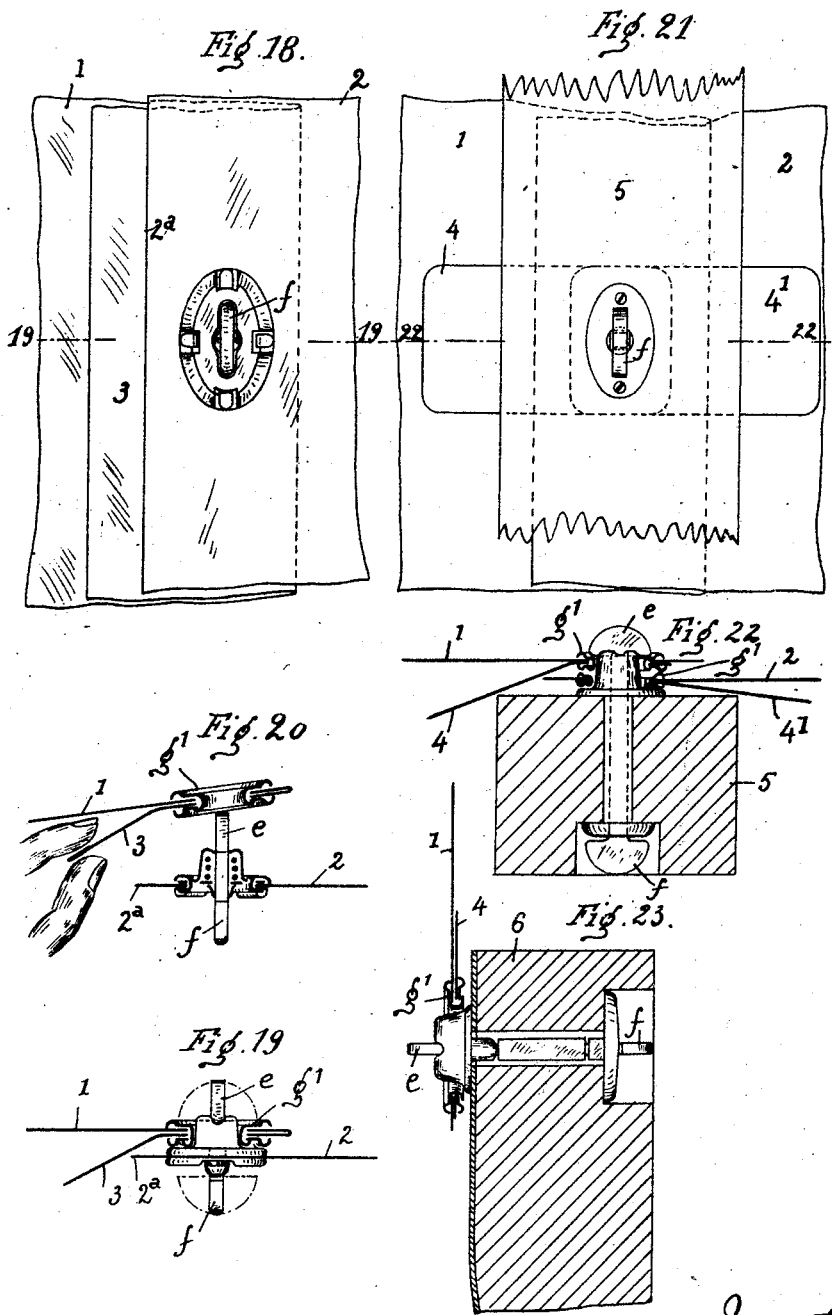

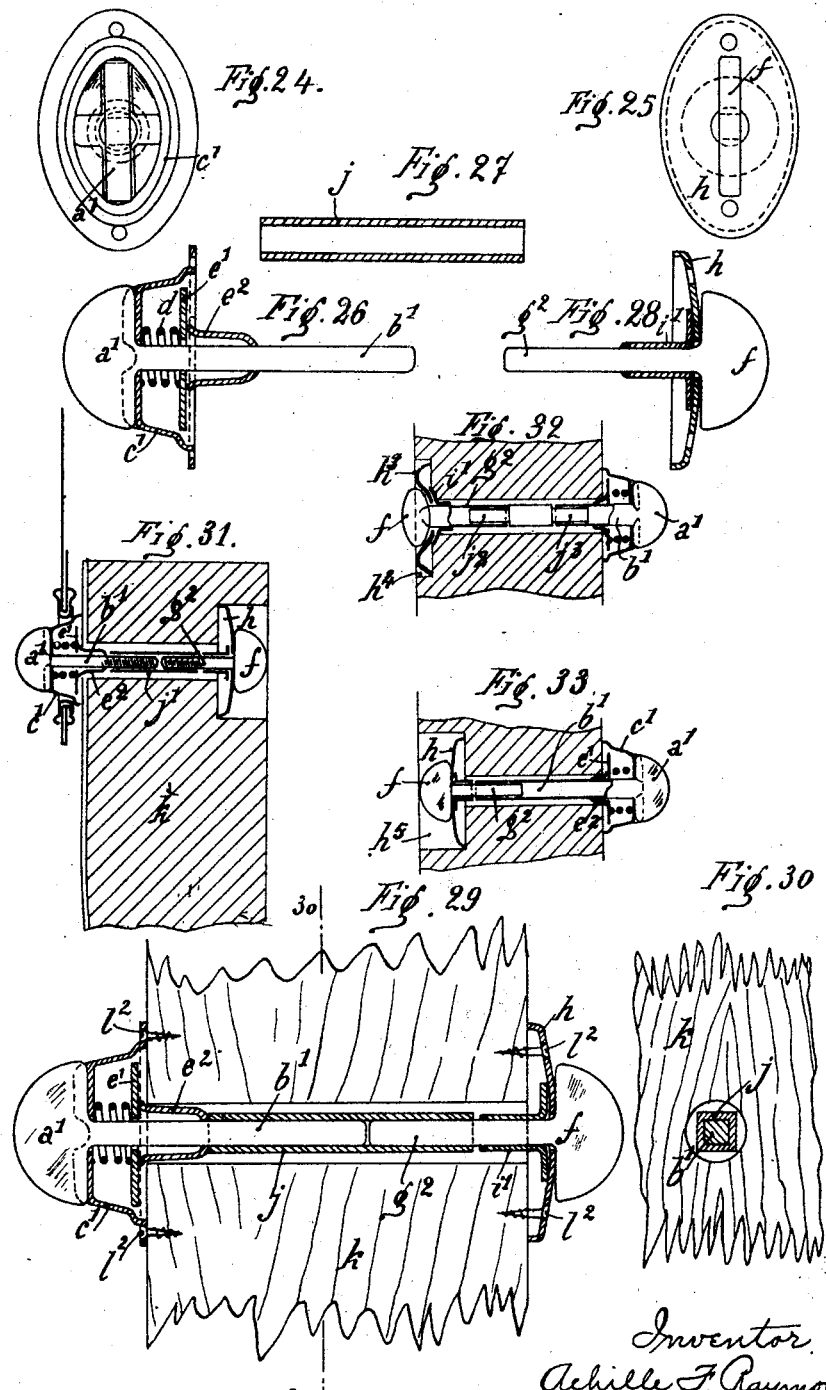

Patented Jan. 19, 1926.

1,570,281

UNITED STATES PATENT OFFICE.

ACHILLE FRANÇOIS RAYMOND, OF GRENOBLE, FRANCE.

TWO-HEAD ROTATABLE FASTENING DEVICE.

Application filed May 28, 1923. Serial No. 642,010.

*To all whom it may concern:*

Be it known that I, ACHILLE FRANÇOIS RAYMOND, a citizen of France, and a resident of Grenoble, Isere Department, France, have invented certain new and useful Improvements in Two-Head Rotatable Fastening Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The closing by means of press buttons or studs, or of rotatable fasteners, that is to say by means of fasteners comprising a shank the revolution of which permits the release or engagement of an eyelet upon the body of the fastener etc., as used heretofore to close the curtains of motor car hoods of tents, and the like, have the disadvantage that they allow the fastening or unfastening only from the side where the head of the device stands, that is to say either from inside or from outside.

In order to avoid this disadvantage, applicant has devised the fastener forming the subject-matter of the present invention which is particularly characterized by the fact that the shank of the rotatable fastening device passes entirely through the body of the button or fastener and also through the part to which the same is secured and is provided, at the end opposite the one carrying the usual head, with a second head allowing the same to operate either from outside or from inside.

The present invention has for a further object a way of securing this two head fastener to a fabric or leather such as a hood tener to a fabric or leather such as a hood or curtain as used in motor cars, this securing being obtained by means of rings provided with prongs engaging both sides of the fabric and enclosing the socket part of the fastener, the said rings acting as closing heads being connected together through clinching of the prongs. This invention also relates to the construction and mounting of the second head of the rotatable fastener.

Another object of the present invention consists in an improvement to the fastening of curtains by means of this two head fastener, which essentially resides in the provision, on the internal face of the curtain, of tongues, or of a suitable fold, preferably maintained through the eyelets of the fasteners or studs, so as to facilitate the opening and specially the closing operation of the fasteners for somebody sitting inside the motor car, by allowing to pull the tongues or the fold and consequently the curtain.

Another object of the invention consists in an arrangement of this two head fastener so devised as to secure a flexible fabric to a wall having a substantial thickness, such as a hood to be secured to the body of a motor car; without the necessity of riveting the second head of the fastener to the first one at the time when the fastener is fixed to the car.

According to the invention, the rotatable fastener is composed of a first head the shank of which passes through the body of the rotatable part (which comprises internally a coil spring or leaf) and is so mounted as to be able to revolve without being capable however of coming out of the latter, and of a second head passing through a socket of oval shape or any other shape which is adapted to be secured to the other side of the wall and in which the second head can revolve without coming out, the connection of the shanks which is an extension of the fastener heads being effected in any suitable manner, such as sleeving on, threading, pinning and the like.

The following specification will allow an understanding of the invention with reference to the accompanying drawing given by way of example, in which:

Fig. 1 is a longitudinal section of a first mode of carrying out the invention as used in connection with a rotatable fastening device provided with a coil spring.

Fig. 2 is a section on line 2—2 of Fig. 1.

Fig. 3 is a longitudinal section of a rotatable fastening device with leaf springs, made according to the invention and adapted to combine a rigid part with a flexible or yielding one.

Fig. 3$^{bis}$ is a section on line 3—3, Fig. 3.

Fig. 4 is a longitudinal section of a rotatable fastening device with leaf springs for connecting two flexible parts.

Fig. 5 is a section on line 5—5 of Fig. 4.

Fig. 6 is an underside view of the fastener as shewn in Fig. 4.

Fig. 7 is a longitudinal section of a fastener similar to the one shewn in Fig. 4 but provided with a covered eyelet.

Fig. 8 is a modified form of construction of the fastener for connecting two flexible parts in two different manners.

Fig. 9 is a section made on line 9—9 of Fig. 8.

Fig. 10 is an elevation partly in section of a modified form of fastener.

Fig. 11 is a plan view of the socket part of the fastener, on a smaller scale.

Figs. 12 and 13, are, respectively, section and plan views of the upper closing head ring.

Figs. 14 and 15 are respectively section and plan views of the lower closing head ring.

Fig. 16 is a perspective view of the second head of the fastener before connecting the same together.

Fig. 17 shows the second head connected with the axis or shank of the rotatable part.

Fig. 18 is an elevation as seen from the internal side of the car, of a curtain secured to another curtain by means of a rotatable fastener.

Fig. 19 is a section on 19—19 of Fig. 18.

Fig. 20 is a section similar to that of Fig. 19 adapted to explain the operation of the device.

Fig. 21 shows in elevation two hood curtains which are to be secured to one of the uprights of the car body.

Fig. 22 is a section on line 22—22 of Fig. 21.

Fig. 23 shows in section the securing of a hood curtain to the upper part of a car-body, according to the present invention.

Fig. 24 is a plan view of a first head of the rotatable fastener.

Fig. 25 is a plan view of the second head.

Figs. 26, 27 and 28 are longitudinal sections of three parts constituting the fastener according to the present invention.

Fig. 29 shows in longitudinal section a fastener secured to a wooden wall.

Fig. 30 is a section on line 30—30 of Fig. 29.

Figs. 31 to 33 are respectively schematic sections of modified forms of construction of the rotatable fastener.

In the arrangement shewn in Figures 1 and 2, the fastening device is composed in the usual manner of a stud or socket $a$, of oval section or any other shape, secured by any suitable means, to one of the fabric or canvas parts, $b$ for example. Inside this socket or cup $a$ is arranged a square shank $c$ connected with the ordinary head $e$.

A coil spring $d$ bears upon a collar of the shank $c$ and applies the head $e$ connected with the latter into grooves provided in a well known manner upon the cover of the socket $a$, in order to steady the said head at the required place corresponding to the opening and closing position of the fastener and to allow the eyelet $g^1$ to stop the head of the key or to let the same pass.

According to the invention, to the free end of the shank $c$ is riveted or secured by any other means a second head $f$, constituted for example by a circular metal sheet which is suitably folded or bent over. The second side $g$ of the fabric or canvas to be fastened is connected with the eyelet $g^1$ which covers the socket $a$, as shewn in Fig. 1.

The releasing and closing of the fastener are effected in the usual manner by means of the head $e$ from the side where the body of the rotatable fastener stands; on the other side the fastening and unfastening are obtained in causing the second head $f$ to rotate in the required direction.

In the modified form of construction shewn in Figures 3 and $3^{bis}$, the shank $c$ is maintained in the well known manner in the suitable positions at 90° one with reference to the other corresponding to the fastening and unfastening positions of the device by two leaf springs $h^1$, $h^2$ located inside the socket $a$ and bearing upon two opposed faces of the square shank $c$. The construction, as shewn in Figure 3, refers to a two-head fastener as used for securing a strip of fabric or leather $g$ to a wooden or metal wall or partition $i$. The shank $c$ is of sufficient length to extend through the thickness of the wall $i$.

Figures 4, 5 and 6 show a leaf-spring rotatable fastening device as used for connecting together two flexible parts $g$, $b$, which are the sides of the canvas of a tent, hood, and the like. The second head $f$ of the fastener is made of a metal leaf curved for example in the shape of a bow, as shewn in Figure 4. The top of this bow is provided with a circular hole $f^1$ allowing the passage of the die for riveting the head $f$ to the key $c$.

Figure 7 shows an arrangement of the fastener in which the eyelet $g^1$ is covered in the usual manner by a plate $g^2$ giving to the same a neater appearance.

Finally, Figures 8 and 9 show a fastening device provided with two cups or sockets $a^1$, $a^2$ which are arranged opposite each other and are secured to the fabric $b$ to be connected. One of these sockets only, for example, the socket $a^1$, contains the spring leaves $h^1$, $h^2$, the other one being made of wood, of metal or any other material. This arrangement allows of securing the eyelet $g^1$ to one or the other side of the canvas $b$, as shewn in full lines and in dash and dotted lines in Figure 9. This device can also be secured to a rigid or stiff part in order to connect the same with a flexible one.

In order to facilitate the fastening of the eyelet or of the body of the rotatable device to flexible parts made of fabric, leather and the like, there is secured to the underpart of the eyelet, or under the socket, a tongue made of leather, fabric or any other suitable material which allows of exerting the pull which is necessary in order to bring the eyelet upon the body of the fastener.

This tongue can moreover be constituted by a simple fold of the flexible part $g$, as shewn in Figures 2, 5 and 9.

The socket $a$ the base of which is perforated at $a^0$ (Figure 11) is placed upon the fabric $b$ which is also provided with an opening for the passage of the head $f$ and with slots corresponding to the holes $a^0$ of the base $a$ and serving for the passage of prongs $l^1$ of the upper ring $l$.

This ring $l$ is in fact constituted (Figs. 12 and 13) by an oval ring $l$ having the form of the base of socket $a$ and is provided on its inner edge with prongs or claws $l^1$, as shewn in Figures 12 and 13. The lower ring (Figures 14 and 15) consists in a disc $m$ provided at $m^1$ with slots which are conveniently located and through which the prongs $l^1$ pass and with a central opening $m^2$ traversed by the head $f$. This disc is preferably flanged around its periphery so as to form bulged parts M.

In order to secure the fastener or stud to the fabric $b$, the socket $a$ being placed in position, the latter is covered by means of the upper ring $l$ the prongs $l^1$ of which pass through the holes $a^0$ and the slots provided in the fabric $b$. Then the ring $m$ is engaged by its lower part (Fig. 10) so as to cause the prongs $l^1$ to enter the slots $m^1$. It is only necessary then to fold down the prongs $l^1$, as shewn in Fig. 10, in order to obtain a strong securing of the socket $a$ to the fabric $b$; in this operation, the ends of the prongs $l^1$ enter, as shewn in Figure 10, between the bulged parts $m$ covering the same.

The second head $f$ of the rotatable fastener can be constituted by a flanged part $f^0$, Figure 16, having the form of an hollow half-disc. After the internal spring $d$ of the rotatable fastener has been mounted and the sleeve of the supporting disc $o$ has been set in position (Figure 10), the latter being engaged upon the shank $c$ and pressing the spring $d$ against the bottom of the socket $a$, the end of the shank $c$ is opened, and then covered with the flanged part $f^0$ which is afterwards clamped upon the said end, as shewn in Fig. 17.

When the curtains 1, 2 of a tent or of a motor car, are connected together by means of the rotatable fastener and the second head $f$ of this fastener is directed towards the interior of the car or of the tent, but little difficulty is encountered when it is desired to open the curtains from within the car, whereas it is only necessary, after having turned the stud to press against the curtain 1 connected with the socket part $g^1$ to release the latter from the body of the fastener.

On the contrary, when the curtains are open and it is desired to close them from within the car body, that is to say when it is desired to make use of one of the most interesting conveniences which is secured by the utilization of the above described two-head rotatable fastening, a certain difficulty is encountered in bringing the curtain 1 carrying the socket part or eyelet, against the curtain, whereas this curtain 1 affords no seizing or grasping for the operation.

In order to avoid this, the curtain 1 is inwardly folded at 3; this fold 3 extends beyond the edge $2^a$ of the curtain 2 can thus be seized or grasped, as shewn in Figure 20, by the left hand between the thumb and the fore-finger (position of Figure 20) and pulled so as to bring the socket part $g^1$ upon the stud part (position of Fig. 19). It is then only necessary to turn the head $f$ with the right hand in order to bring together and close the curtains.

The fold 3 can be replaced by a single tongue 4 preferably located as high as the rotatable fastener and held in the eyelet $g^1$ of the fastener when placed upon the curtain, as shewn in Figure 21. This figure shows the fastening to an upright 5 of the car-body of two curtains 1 and 2 each one of which carries eyelets or socket parts $g^1$ which engage the head $e$ of a two-head rotatable fastener arranged in the upright 5 of the car body.

To close the curtains from within the car, it is only necessary to pull successively the tongues $4^1$ and 4 projecting from the upright 5 so as to engage the eyelets $g^1$ on the body of the fastener, then in holding the tongue 4 with the left hand for instance to cause the head $f$ to pivot with the right hand (Figure 22) so as to close the fastener.

Figure 23 shows the arrangement of one tongue 4, to the curtain 1 secured by means of a rotatable fastener of the kind hereinbefore set forth to the upper side of the car body 6.

As shewn in Figures 26 to 28, the fastener made according to the invention can comprise:

1. A first head (Fig. 26) $a^1$ the shank $b^1$ of which traverses the body $c^1$ of the fastener, in which it can freely turn and extends on a certain length beyond this body $c^1$, while preserving its square section. A spring $d$ is provided, in the usual manner, within the body $c^1$ of the fastener so as to press the head $a^1$ against the body $c^1$. The shank $b^1$ is yieldingly maintained in the body $c^1$ through a sort of collar $e^2$ connected with the shank $b^1$ and bearing against the bottom plate $e^1$ of the rotatable fastener, the said plate acting as a bearing for the spring $d$; this plate $e^1$ is somewhat loose within the body of the fastener so as to be able of slightly sliding in following the movement of the key head which moves up and down in its rotary motion when passing the notches of the fastener body and strains or relaxes the coil spring which is confined between the bottom of the fixed body $c^1$ of the fastener and the plate $e^1$.

2. A second fastener head (Figure 28) which has in the drawing the form of a key $f$ but which could be replaced by a more or less flattened oval stud or button or by a loop. A square shank $g^2$, connected with the head $f$ traverses a socket $h$ of oval or other shape which is used for fixing the head to the wall, a collar or washer $i^1$ is connected with the shank $g^2$, that is to say is soldered, pinned or riveted to the shank. This collar $i^1$ could moreover be replaced by lugs cut from the shank. This arrangement allows the shank $g^2$ to rotate in the socket $h$ while preventing the same from coming out therefrom. The socket $h$, as shewn in Fig. 25 is of oval shape. This shape is preferably adopted because it enables one to find out the position of the key corresponding to the opening or closing of the fastener, more conveniently than any other shape, but of course any other form could be eventually preferred.

3. A tube $j$ (Figure 27) having an internal section capable of insuring a driving action such as a square, rectangular oval or polygonal section and which is preferably longer than the longest of the shanks $b^1$, $g^2$ and which can be applied upon the latter so as to connect them together.

The securing of the rotatable fastener is effected in the same manner in case the same is used in connection with a motor car.

In the wall $k$ (Fig. 29) of the car body is drilled a hole, of cylindrical form for example, whose diameter (Fig. 30) is greater than the diameter of the tube $j$ so that the latter can freely turn in this hole. The body $c^1$ of the first head of the rotatable fastener is secured to the face of the wall $k$ which is adapted to receive the hood by means of screws $l^2$, or nails, claws, or any other means. The shank $g^2$ of the second key is then introduced into the tube $j$ and the whole is engaged into the hole drilled in the car body, so that the shank $b^1$ will enter the tube $j$; the two keys are then connected together and the socket $h$ is secured by any suitable means to the second face of the car body $k$.

By introducing the tube $j$ upon the shank $b^1$, care must be taken so that the head $f$ be in the same plane as the head $a^1$ so that the positions of the two heads will be the same when opening or when closing and so that the movement of the keys, either from outside or from inside, cannot be confused.

The free lengths of the ends of shanks $b^1$ and $g^2$ are such that when a certain portion of length of the tube $j$ is added thereto, they will correspond to the normal thickness of the car body, but it is obvious that they can be of any required sizes and that particularly in the case of thick car-bodies, the shanks are made of a greater length and of a greater thickness so as to offer a sufficient resistance to the torsion of metal.

The securing of the fastener to a wooden wall has just been described, but it must be understood that it could be secured to any kind of material, such as metal, plastic matters, and the like.

If it is desired to prevent the key $f$ which generally points towards the interior of the car body from projecting from the latter, the socket $h$ can be made of an hollow form $h^3$, as shewn in Figure 32, and this socket can be fixed in a recess $h^4$ provided in said car body, so as to constitute a seat for the head $f$, which, as shewn in Figure 32, projects but slightly.

The head $f$ can also be entirely concealed within the recess $h^5$, as shewn in Figures 31 and 33.

The way of connecting together the shanks of the two keys of the rotatable fastener is capable of numerous alterations. For example, as shewn in Figure 31, these cylindrical shanks could be threaded and screwed tightly within a tube $j^1$ which is tapped. In the same way the shank $b^1$ can be hollow (Figure 33) and can receive at its end the shank $g^2$ which eliminates the tube $j$.

Finally, this tube $j$ could still be provided at its two ends with portions $j^2$, $j^3$ of a square section, which would enter into the shanks $b^1$ and $g^2$ of tubular form with a square section (Fig. 32).

At last, the tube $j$ could be flush with the interior of the car body on the side, where the second head lies, the same being then secured to the tube $j$ by means of pins, or the like.

Detail alterations may be made to the present invention without departing from its principle.

What I claim is:

1. A fastener of the character described, comprising a stud, a shank rotatably mounted in the stud and of sufficient length to extend therethrough and through the part to which the stud may be connected, said shank having finger grip heads on opposite ends constituting combined locking and actuating means one of said heads arranged to lock with said stud whereby the shank may be rotated alternately into engaging and releasing positions from either end.

2. In a fastener of the character described, the combination of two members to be connected together, a stud secured to one of the members, a shank rotatably mounted in the stud and of sufficient length to extend through the stud and through both of said members, said shank having a head on each end constituting combined locking and actuating means one of said heads arranged to hold the members together and having locking engagement with the stud whereby the shank may be rotated to engage or release the other member.

3. In a fastener of the character described, the combination of two members to be connected together, a stud secured to one of the members, an eyelet in the other member adapted to receive the stud, a shank rotatably mounted in the stud and of sufficient length to project through the latter and through both of said members, and locking heads on both ends of the shank forming finger grips for rotating the latter into engaging and releasing positions, the locking head passing through said eyelet having locking engagement with the stud.

4. In a fastener of the character described, the combination of two members to be detachably connected together, a stud mounted on and projecting outwardly from one of the members, an eyelet in the other member adapted to receive the stud, a gripping member secured to said other member, a shank rotatably mounted in the stud, a head on one end of the shank adapted to engage the stud, and a head on the other end of the shank adapted to lock the eyelet onto the stud, both heads forming finger grips for rotating the shank from either end.

5. In a fastener of the character described the combination of two members to be detachably connected together, a stud projecting upwardly from one of said members, an eyelet in the other member adapted to receive the stud, a flexible tongue connected to the eyelet forming a gripping member, a shank rotatably mounted in the stud and of sufficient length to project through the latter and through the eyelet, a locking head on one end of the shank adapted to engage the stud, and a head on the other end of the shank adapted to prevent the removal of the eyelet from the stud, both heads forming finger grips whereby the shank may be rotated from either end.

6. In a fastener of the character described, the combination of two members to be detachably connected together, a stud connected to one of said members, an eyelet in the other member adapted to receive the stud, a shank rotatably mounted in the stud, and of sufficient length to project through the stud and both of said members, a head secured to the shank, means engaging the shank inside the stud for holding the head in two positions at right angles to each other, and a second head provided on the other end of the shank.

7. In a fastener of the character described, the combination of two members to be detachably connected together, a stud connected to one of said members, an eyelet in the other member adapted to receive the stud, a shank rotatably mounted in the stud and of sufficient length to project through the stud and both of said members, a head on one end of the shank, and a head on the other end of the shank consisting of a hollow member having its walls swaged onto the end of the shank.

8. In a fastener of the character described, the combination of two members to be detachably connected together, a stud connected to one of said members, an eyelet in the other member adapted to receive the stud, a shank rotatably mounted in the stud and of sufficient length to project through the stud and both of said members, a head on one end of the shank, and a head on the other end of the shank consisting of a hollow half-disc mounted upon an enlarged portion of the shank and having its walls brought together on either side of the shank.

In testimony that I claim the foregoing as my invention, I have signed my name hereto.

ACHILLE FRANÇOIS RAYMOND.